(12) United States Patent
Duncan et al.

(10) Patent No.: US 7,663,970 B2
(45) Date of Patent: Feb. 16, 2010

(54) METHOD FOR PASSIVE SEISMIC EMISSION TOMOGRAPHY

(75) Inventors: Peter M. Duncan, Houston, TX (US);
James D Lakings, Houston, TX (US);
Roderick A. Flores, Edgewood, NM (US)

(73) Assignee: Microseismic, Inc., Houston, TX (US)

( * ) Notice: Subject to any disclaimer, the term of this patent is extended or adjusted under 35 U.S.C. 154(b) by 477 days.

(21) Appl. No.: 11/522,183

(22) Filed: Sep. 15, 2006

(65) Prior Publication Data

US 2008/0068928 A1    Mar. 20, 2008

(51) Int. Cl.
*G01V 1/28* (2006.01)
*G01V 1/32* (2006.01)

(52) U.S. Cl. .............................. 367/38; 367/47; 181/112

(58) Field of Classification Search ................... 367/38, 367/47, 73, 48; 181/112
See application file for complete search history.

(56) References Cited

U.S. PATENT DOCUMENTS

| 5,148,110 | A | | 9/1992 | Helms | |
|---|---|---|---|---|---|
| 5,377,104 | A | * | 12/1994 | Sorrells et al. | 702/11 |
| 5,747,750 | A | * | 5/1998 | Bailey et al. | 181/112 |
| 5,774,419 | A | | 6/1998 | Uhl et al. | |
| 5,917,160 | A | * | 6/1999 | Bailey | 181/112 |
| 5,934,373 | A | | 8/1999 | Warpinski et al. | |
| 5,963,508 | A | | 10/1999 | Withers | |
| 5,996,726 | A | | 12/1999 | Sorrells et al. | |
| 6,049,508 | A | | 4/2000 | Deflandre | |
| 6,389,361 | B1 | | 5/2002 | Geiser | |
| 6,414,492 | B1 | | 7/2002 | Meyer et al. | |
| 6,462,549 | B1 | | 10/2002 | Curtis et al. | |
| 6,947,843 | B2 | | 9/2005 | Fisher et al. | |
| 6,985,816 | B2 | * | 1/2006 | Sorrells et al. | 702/14 |
| 2005/0190649 | A1 | | 9/2005 | Eisner et al. | |
| 2006/0062084 | A1 | | 3/2006 | Drew | |
| 2006/0285438 | A1 | * | 12/2006 | Arrowsmith et al. | 367/38 |

OTHER PUBLICATIONS

Rowe, et al. Using Automated, High-precision Repicking to Improve Delineation of Microseismic Structures at the Soulz Geothermal Reservoir. Pure and Applied Geophysics, 159 (2002).*

* cited by examiner

*Primary Examiner*—Scott A Hughes
(74) *Attorney, Agent, or Firm*—Richard A. Fagin

(57) ABSTRACT

A method for seismic event mapping includes transforming seismic signals recorded at selected positions into a domain of possible spatial positions of a source of seismic events. An origin in spatial position and time of at least one seismic event is determined from space and time distribution of at least one attribute of the transformed seismic data.

16 Claims, 2 Drawing Sheets

METHOD FOR PASSIVE SEISMIC EMISSION TOMOGRAPHY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic data acquisition and processing to image subsurface Earth formation structures. More specifically, the invention relates to methods for acquiring and processing passive seismic data, that is, seismic data acquired without the use of a controllable source.

2. Background Art

Passive seismic emission tomography is a process in which an array of seismic sensors is deployed in a selected pattern on the Earth's surface (or on the water bottom in marine surveys) and seismic energy is detected at the sensors that emanates from various seismic events occurring within the Earth's subsurface. Processing the signals detected by the sensors is used to determine, among other things, the position in the Earth's subsurface at which the various seismic events took place.

Applications for passive seismic emission tomography include, for example, determining the point of origin of microearthquakes caused by movement along geologic faults (breaks in rock layers or formations), movement of fluid in subsurface reservoirs, and monitoring of movement of proppant-filled fluid injected into subsurface reservoirs to increase the effective wellbore radius of wellbores drilled through hydrocarbon-producing subsurface Earth formations ("fracturing"). The latter application, known as "frac monitoring" is intended to enable the wellbore operator to determine, with respect to time, the direction and velocity at which the proppant filled fluid moves through particular subsurface Earth formations.

Passive seismic emission tomography for the above types of interpretation includes determining what are seismic-induced events from within the signals detected at each of the seismic sensors, and for each event detected at the seismic sensors, determining the spatial position and time of the origin of the seismic event. Passive seismic interpretation methods known in the art are undergoing continuous improvement to better resolve the source of seismic events originating from the Earth's subsurface. There continues to be a need for improved methods of passive seismic emission tomography.

SUMMARY OF THE INVENTION

A method for seismic event mapping according to one aspect of the invention includes transforming seismic signals recorded at selected positions into a domain of possible spatial positions of a source of seismic events. An origin in spatial position and time of at least one seismic event is determined from space and time distribution of at least one attribute of the transformed seismic data.

A method for monitoring fracture fluid front movement in the Earth's subsurface according to another aspect of the invention includes recording seismic signals proximate a wellbore during pumping of fracturing fluid into the wellbore. The recorded signals are transformed into a domain of possible spatial positions of a source of seismic events. At least one origin in spatial position and time is determined for at least one seismic event associated with movement of the fracturing fluid front from the space and time distribution of at least one attribute of the transformed seismic data.

Other aspects and advantages of the invention will be apparent from the following description and the appended claims.

DETAILED DESCRIPTION

Figure 1:
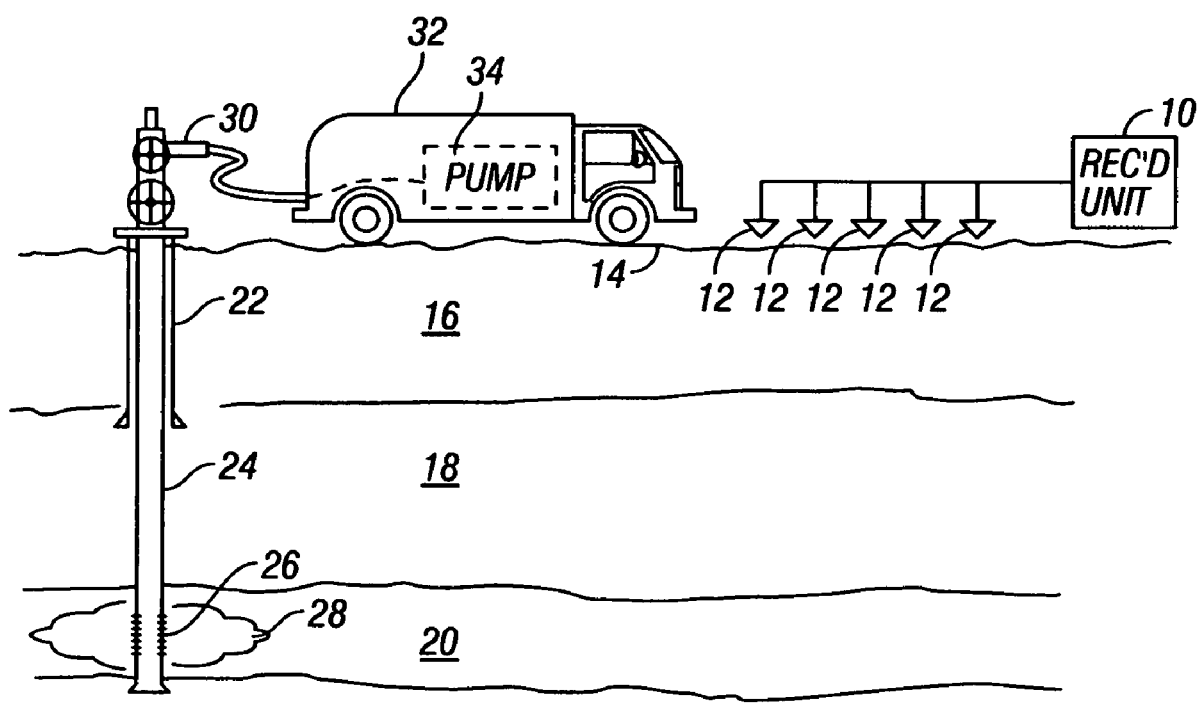
FIG. 1 shows an arrangement of seismic sensors used in a passive seismic method according to one embodiment of the invention associated with frac monitoring.

FIG. 1 shows a typical arrangement of seismic sensors as they would be used in one application of a method according to the invention. The embodiment illustrated in FIG. 1 is associated with an application for passive seismic emission tomography known as "frac monitoring." It should be clearly understood that the application illustrated in FIG. 1 is only one possible application of a method according to the invention.

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors 12 generate electrical or optical signals in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within a wellbore drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, the sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, noise from the pumping unit 32 and similar sources near the wellhead 30 may be attenuated in the seismic signals by frequency-wavenumber (f k) filtering. Other processing techniques for noise reduction and/or signal enhancement will occur to those of ordinary skill in the art.

Figure 2:
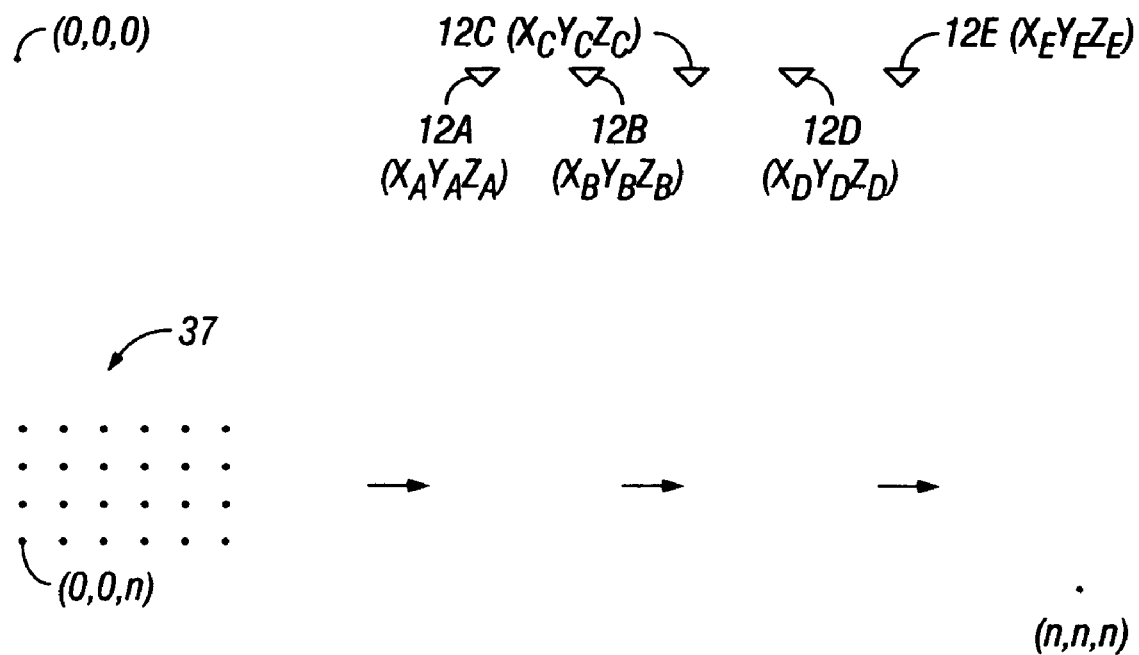
FIG. 2 illustrates a sensor space domain to source space domain data transformation used in association with a method according to the invention.

FIG. 2 illustrates a first principal element of a process according to the invention. A coordinate system may be arranged to define a plurality of points, or preferably, centers of geometric cells of selected dimensions in the Earth. The cells may have selected dimensions such as 10 meters or other suitable size, depending on, among other factors, the bandwidth of the signals detected by the sensors 12A through 12E.

An arbitrary origin (0,0,0) may be defined, and in the present embodiment, may be located at the position of the wellhead (30 in FIG. 1) and on the Earth's surface. Spatial coordinates of each sensor 12A-12E may thus be defined as shown in FIG. 2 as $(X_A, Y_A, Z_A)$ through $(X_E, Y_E, Z_E)$. The coordinate system may be defined to a selected number n of cell increments in any or all three spatial dimensions, as shown in FIG. 2 extending to a maximum depth at the wellhead position (0,0,n) to a maximum distance from the wellhead at point (n,n,n). The number of cell increments may be the same or different in each of the three dimensions. The above example is described in terms of Cartesian coordinates, however it should be clearly understood that cylindrical, spherical or other coordinate system may be used in other implementations.

For each selected cell defined in the coordinate system, there is an expected travel path of seismic energy to each of the seismic sensors 12A-12E, and each such travel path will be associated with a travel time of seismic energy. The expected travel path and associated travel time may be calculated using a velocity model for the subsurface Earth formations (16, 18, 20 in FIG. 1) that may be obtained from various sources such as reflection seismic data and well log data, among others. The expected travel times thus calculated for each defined cell in the coordinate system may be stored in a table. The signals from each sensor 12A-12E that correspond to a particular defined point can be adjusted sequentially for travel time from a given cell location (similar to moveout correction in reflection seismic data processing) and are then summed or "stacked." The result is, for each cell, a stacked data trace over at least part of and preferably the entire duration of data recording. The foregoing procedure is referred to as transforming the seismic signals into the source space domain. The travel time table based on the velocity model is a convenient implementation to enable rapid computation of the stacked traces in the source space domain. It should be understood that other computation devices may be used to perform the signal domain transformation.

Figure 3:
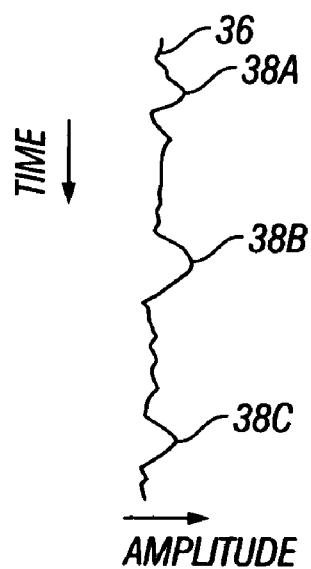
FIG. 3 illustrates selecting "triggers" from seismic data transformed to the source space domain according to one embodiment of a method according to the invention.

The transformed seismic signals may then be processed using data processing techniques known in the art to further reduce noise and/or enhance signal. After such processing, the source domain transformed seismic data, referred to for convenience herein as "source traces", are analyzed to determine the presence of events or "triggers", which are nominally high amplitude or high energy features that are believed to correspond to seismic events originating in the Earth's subsurface. An example of trigger identification is shown graphically in FIG. 3. A data trace 36 of domain transformed signal at one selected point is shown by curve 36. Triggers are shown at 38A, 38B and 38C. Triggers may be identified by, for example, amplitude exceeding a selected threshold, trace energy within a selected length time window exceeding a selected threshold, or the first derivative of the trace amplitude with respect to time exceeding a selected threshold. Other devices for selecting triggers will occur to those skilled in the art.

Triggers that are associated with a common microseismic event signal will typically be associated with a finite cell space volume (a plurality of closely spaced cells) approximately centered on the source trace having the trigger with the most significant source trace attribute. The limits of the possible volume occupied by the triggers associated with a single microseismic event are related to the frequency content and amplitude of the microseismic event signal, and the velocity model used to perform the data transformation to the source space domain. Such relationship enables one of a number of functions known in the art to be used to calculate the maximum radial distance for which a plurality of triggers are likely to represent a common seismic event. A process referred to herein as "event clustering" is intended to identify triggers that originate from a common seismic event. Event clustering begins by identifying those triggers whose spatial distances from the event origin are less than the maximum distance predicted for a microseismic signal given the geological structure (velocity model) and the arrangement of seismic sensors at the surface (or water bottom).

Triggers associated with a single microseismic event will occur within a short time window that typically brackets the origin time of the microseismic event. If the difference in time of occurrence between any two spatially associated triggers is less than the absolute value of the radial offset divided by the interval velocity between the triggers, then the triggers under evaluation are most likely associated with an event "family" where a family is a set of triggers that are inferred to have a common origin in a single microseismic event. Association of a particular trigger with a family may be selected when the trigger being evaluated satisfies the expression:

$$|T_1 - T_0| \leq |R_1 - R_0|/V_i + \epsilon_1 \quad (1)$$

wherein $T_1$ represents the trigger being evaluated, $T_0$ represents the previous trigger, $R_1$ and $R_0$ respectively, represent the distance in space between the cell centers of each associated trigger, and $V_i$ represents the interval velocity of the subsurface formation associated with the cells. $\epsilon_1$ in equation (1) is a small error term in units of time. The error term is included to account for certain errors in the acquisition and processing procedure. One source of error is the uncertainty associated with determining the origin time of the seismic event. Error in origin time of the event can result from the choice of the trace attribute used to identify the trigger. The presence of noise in the seismic signals, and thus the source traces, will also influence the calculations and affect the origin time estimates. Error in origin time may also be caused by the transformation of the seismic signals to the source space domain with an inaccurate velocity model. Techniques for estimating these errors are well known in the art, but the ability to specify the nature and magnitude of the errors is important to account for the clustering process to be explained below in which triggers are assigned to families.

Triggers in two different traces may satisfy equation (1) even though the triggers represent two separate microseismic events. Resolving such ambiguity can be explained as follows. Triggers that are calculated as being in a cell located deeper in the subsurface than the actual position of the seismic event origin will have an event origin time that is earlier than the actual source origin time. This inverse time-depth relation results from the transformation operator calculating a travel-time that is larger than the actual travel time, as a result of the transform being estimated for an incorrect, deeper cell than that of the actual origin of the seismic event. Conversely, triggers in cells that are shallower than the actual event origin will be assigned travel times that are smaller than the actual travel time and therefore estimate a later event origin time. The foregoing inverse time-depth relationship can be mapped in cell space according to the conditions specified in the equations below for assessing whether the trigger behaves according to the inverse time-depth relationship in source space. If the distance described by equation (1) for two triggers is satisfied, the trigger will be associated with an event "family" if either of the two inverse time depth conditions below is satisfied.

$$Z_1 \leq Z_0 \text{.and.} T_1 > (T_0 - \epsilon) \text{.or}$$

$$Z_0 \leq Z_1 \text{.and.} T_1 < (T_0 + \epsilon) \quad (2)$$

The event cluster process is configured to identify all triggers or other seismic signal attributes that can be associated with a particular seismic event origin. Since the expected event origin point and time, or "hypocenter", of a microseismic event is believed to have the most significant source trace attribute, the first step in the clustering process can be to sort all the triggers by the amplitudes of the respective attribute. Ordering the triggers by the selected trace attribute effectively windows the data by at least one dimension. The sorting provides for a certain efficiency in the event clustering process but is not necessary to the successful completion of the process. Other methods of increasing the efficiency of the process will occur to those skilled in the art. The process proceeds by using an agglomerative clustering technique to generate metaclusters of the triggers referred to here as the trigger families.

In agglomerative clustering each trigger is tested for association with a possible seismic event and is eventually assigned to a family of triggers all inferred to be the result of that event. A threshold distance is determined based on the time-distance relations that are mapped through cell space. The distance between a trigger and the current center for each family is compared to the threshold values explained above in equation (1), conditioned by the inverse time-depth relationship explained with reference to equation (2). If the relationship between the trigger and a family satisfies both equation (1) and (2), this trigger becomes associated with that family. If the trigger cannot be assigned to any existing family, then it becomes the first member of a new family. The center or origin point of each family may be updated from time to time to reflect the member trigger of the family that has the largest trace attribute value. The process continues to consider each trigger and assign them to a family.

For example, the first event from the sorted series of triggers is selected as a possible seismic event location. The next trigger from the amplitude sorted series is then compared to the first event. The comparison measures the cluster distance, as described by equation (1), between the two triggers. If the conditions of equation (1) and 2 are met, the trigger is joined to the family associated with the event. This event is now represented by a family of two triggers. If the condition described by equation (1) or (2) fails, the clustering stops and the second trigger must then be treated as a possible separate seismic event. The next, or in this case third, trigger is selected from the sorted list and it is then compared, and the process is repeated in descending order of trigger amplitudes, for each of the possible events. Each trigger is joined to the first event that satisfies the distance criterion set forth in equation (1) and (2) or else it may be considered as a separate seismic event. The process of selecting triggers and comparing them to possible events continues until all triggers have been joined to possible events or are determined to define possible events.

The result of the foregoing cluster process is a set of trigger families. These families each have a set of internal properties that are useful for assigning a quality criterion to separate microseismic event created signals from other signals and noise detected by the seismic sensors. The primary property that is used to evaluate the families is the peak attribute value of the trigger that is assigned as origin of each family. If the peak amplitude event is below a selected threshold value then that family can be discarded. The selection of the threshold value can be determined with forward models of the seismic data, although empirical techniques and experience of the operator working in the area could also be factors that influence its selection.

The next property that can be used to evaluate family quality is the number of triggers (members) in the family. If a family consists of too few triggers, it may be deemed to be an isolated noise burst, for example. The number of triggers set as the threshold can range from one to the maximum number possible triggers that could be selected as determined by equation (1).

Each family is expected to have the highest amplitude or other significant trace attribute at the spatial and temporal center of the cluster. If there is a significant displacement between the cell location of the most significant trace attribute and an estimated location of the center of the volume obtained by evaluating the mean spatial and temporal distributions of the triggers in the family, then the family is a low quality and may be discarded in some cases as not representative of actual seismic events. The estimate of the mean of a distribution can be made using any of a variety of well known techniques, including simple and weighted averages as well as covariance and weighted covariance estimates.

The shape of the family is another useful property to estimate its significance. The spatial distribution of triggers is ordinarily ellipsoidally shaped. In general the vertical extent of the family is longer than the lateral dimensions. There is likely to be a tilt or rotation of the long axis from vertical caused by the transformation of the seismic data to the source space domain. Such tilt is caused by the position of the family of triggers with respect to the seismic sensors at the Earth's surface. For each event location in cell space an estimate of the shape of the distribution of triggers associated with such an event can be calculated. Families whose shape is significantly deviated from that expected by the imaging of a source in the sub surface will also be assigned a low quality rating.

Once the highest quality families have been selected it is necessary to collapse the family onto a point that represents a discrete hypocenter location. One method to select the origin of the event is to select, as previously explained, the point with the highest value of source trace attribute. Other techniques to estimate the center can use certain properties of the family. For example, weighted mean estimates of the center of the cluster of triggers may be used to determine the hypocenter location. Taking into account that there is a gradient of the source trace attributes for increasing offset from the center, a technique to measure the gradient by taking the divergence over the volume and calculating its center would also provide useful estimates of the origin that may or may not align exactly with the peak trace attribute. Other methods of identifying the hypocenter location for the event represented by the cluster or family of triggers will occur to those skilled in the art.

Another method according to the invention for estimating seismic event hypocenter locations from passive seismic data transformed to source space makes use of predictable time and space distribution of a characteristic seismic attribute of an actual microseismic event. As discussed previously, such distribution arises as a result of the transforming the recorded seismic data to source space using a predetermined velocity structure for the Earth. Assuming there is an event origin at a particular cell location at a particular time, it is possible to calculate the weighted sum of a characteristic attribute of the seismic data in source space over the predicted space and time distribution. If the particular cell is in fact the location of a real microseismic event at that time, the characteristic attribute will sum constructively over the time and space distribution. If the cell is not the origin of an actual event, then the attribute will sum destructively over the distribution. The result of comparing the values of this summation at some or all cell locations, and thus at some or all of the possible event hypocenter locations, will be that those locations having a higher value of the sum, or a normalized variant of the sum, will be chosen as the most likely locations of real event hypocenters.

In a particular application of the foregoing methods of identifying the point of origin of microseismic events, it is possible, for example to map, with respect to time, the propagation of an hydraulic fracture. As explained with reference to FIG. 1, the position at which the pressurized fluid overcomes the overburden pressure of the formation and causes it to break may manifest itself as a microseismic event which can be mapped in space and time as explained above. As the fluid (28 in FIG. 1) propagates the fracture over time, microseismic events will be mapped according to the movement of the point at which the fluid breaks the formation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic event mapping, comprising:
   transforming seismic signals recorded from seismic sensors deployed at selected positions proximate a volume of the Earth's subsurface to be evaluated, the signals being at least one of electrical and optical signals representing measured seismic amplitude with respect to time resulting from seismic events occurring in the volume of the subsurface, the signals conducted to a recording unit for recording, into a domain of possible spatial positions of a source of seismic events; and
   determining an origin in spatial position and time of at least one seismic event in the subsurface volume from space and time distribution of at least one attribute of the transformed seismic data, the determining the origin in including identifying events in the transformed signals that have characteristics corresponding to seismic events, and determining the origin when selected ones of the events meet predetermined space and time distribution criteria.

2. The method of claim 1 wherein the transforming is performed using a model of velocity of Earth formations in a volume of the Earth's subsurface associated with the domain.

3. The method of claim 1 wherein the predetermined characteristics comprise amplitude.

4. The method of claim 1 wherein the events are identified by:
   selecting amplitude features in the transformed signals that exceed a selected threshold;
   sorting the features by amplitude;
   identifying corresponding features in geometrically proximate transformed signals;
   aggregating the corresponding features; and
   estimating a geometric center of the aggregated corresponding features.

5. The method of claim 4 wherein the estimating a geometric center comprises selecting a geometric position corresponding to the one of the features having a maximum amplitude.

6. The method of claim 4 wherein the estimating a geometric center comprises estimating a center of a mean of a distribution of the features.

7. The method of claim 1 wherein the events are identified by calculating a weighted sum of a characteristic of the transformed recorded signals.

8. The method of claim 1 wherein the selected positions are proximate the Earth's surface.

9. A method for monitoring fracture fluid front movement in the Earth's subsurface, comprising:

recording seismic signals at selected positions proximate a wellbore during pumping of fracturing fluid into the wellbore;

transforming the recorded signals into a domain of possible spatial positions of a source of seismic events; and determining at least one origin in spatial position and time of at least one seismic event associated with movement of the fracturing fluid front from space and time distribution of at least one attribute of the transformed seismic signals, the determining the origin in including identifying events in the transformed signals that have characteristics corresponding to seismic events, and determining the origin when selected ones of the identified events meet predetermined space and time distribution criteria.

10. The method of claim 9 wherein the transforming is performed using a model of velocity of Earth formations in a volume of the Earth's subsurface associated with the domain.

11. The method of claim 9 wherein the predetermined characteristics comprise amplitude.

12. The method of claim 9 wherein the events are identified by:

selecting amplitude features in the transformed signals that exceed a selected threshold;

sorting the features by amplitude;

identifying corresponding features in geometrically proximate transformed signals;

aggregating the corresponding features; and estimating a geometric center of the aggregated corresponding features.

13. The method of claim 12 wherein the estimating a geometric center comprises selecting a geometric position corresponding to the one of the features having a maximum amplitude.

14. The method of claim 12 wherein the estimating a geometric center comprises estimating a center of a mean of a distribution of the features.

15. The method of claim 9 wherein the events are identified by calculating a weighted sum of a characteristic of the transformed recorded signals.

16. The method of claim 9 wherein the selected positions are proximate the Earth's surface.

* * * * *